Jan. 21, 1941.　　　L. SCHULTZ　　　2,229,192
TIRE INFLATION INDICATOR
Filed July 15, 1939　　　3 Sheets-Sheet 1
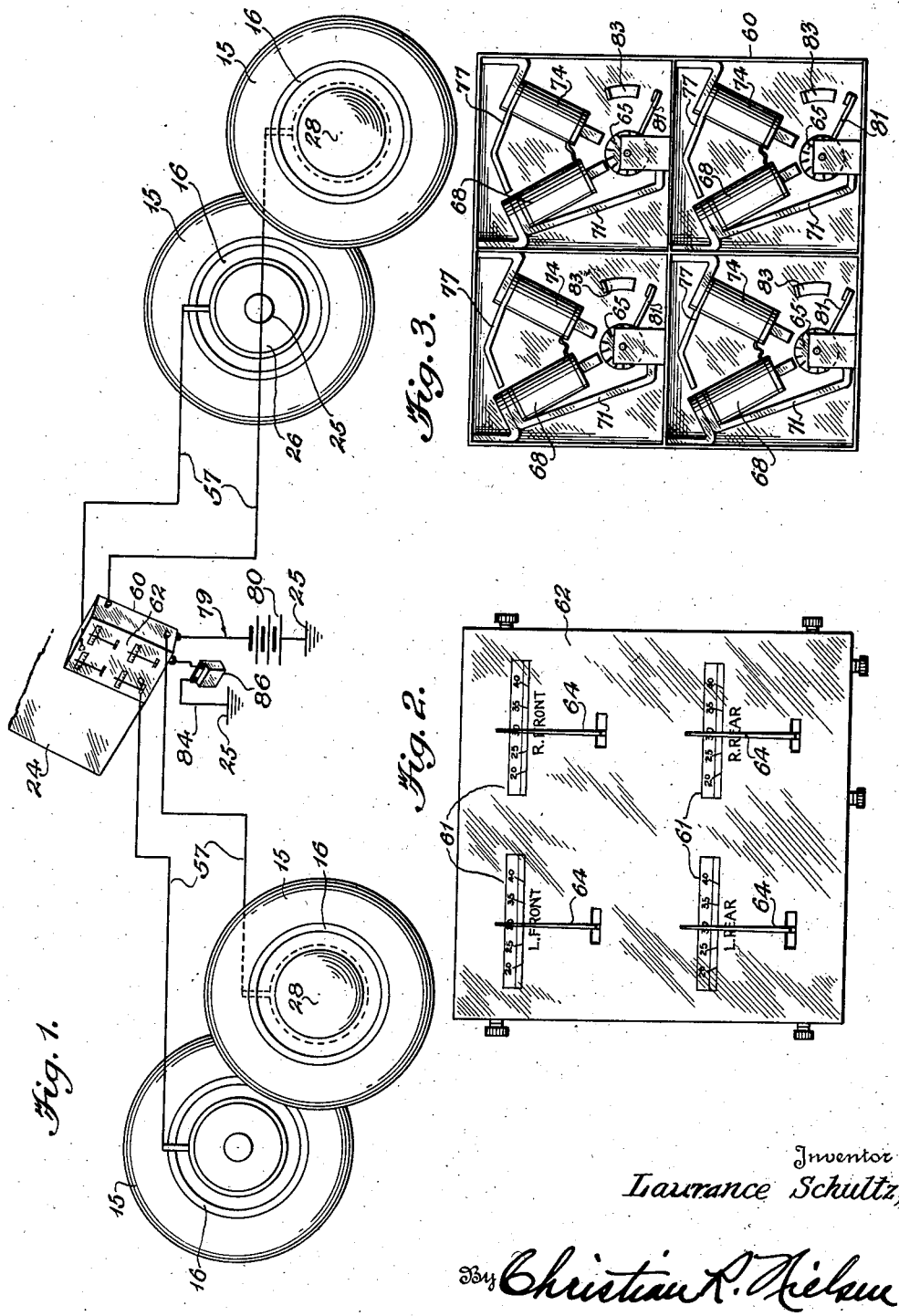
Inventor
Laurance Schultz,
By Christian R. Nielsen
Attorney Jan. 21, 1941.  L. SCHULTZ  2,229,192
TIRE INFLATION INDICATOR
Filed July 15, 1939  3 Sheets-Sheet 2
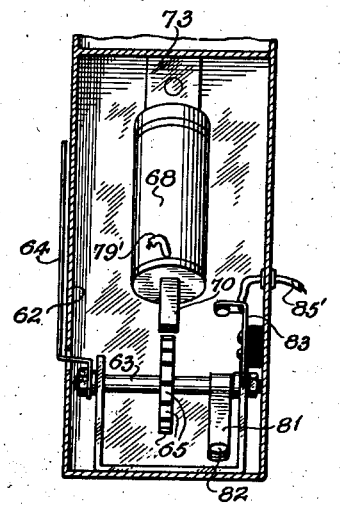
Fig. 5.
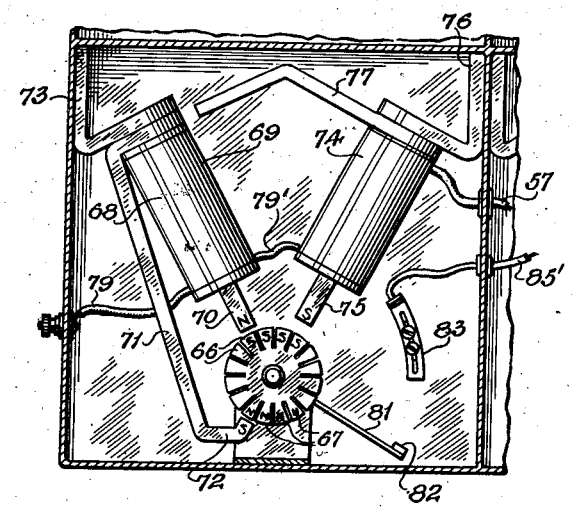
Fig. 4.
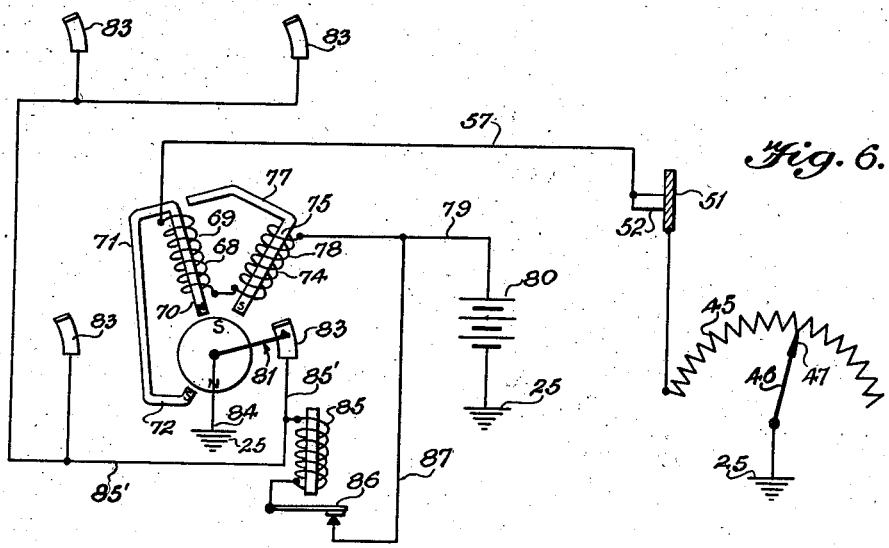
Fig. 6.
Fig. 7.
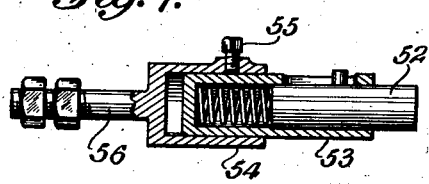
Inventor
Lawrance Schultz.
By Christian L. Nielsen,
Attorney Jan. 21, 1941. L. SCHULTZ 2,229,192
TIRE INFLATION INDICATOR
Filed July 15, 1939 3 Sheets-Sheet 3

Inventor
Laurance Schultz,
By Christian R. Nielsen
Attorney

Patented Jan. 21, 1941

2,229,192

UNITED STATES PATENT OFFICE 2,229,192

TIRE INFLATION INDICATOR

Laurance Schultz, Gardner, Ill.

Application July 15, 1939, Serial No. 284,779

3 Claims. (Cl. 177—327)

The invention relates to means for enhancing the safety of autoists by providing means to forewarn of deflation of pneumatic tires, which is a frequent cause of accident and loss by damage to tires as a result of under-inflation. It is a further aim to overcome difficulties heretofore experienced in constructing practical and satisfactory means for such purposes. An important object of the invention is to enable the accomplishment of the end in view with a minimum amount of apparatus on the tire and wheel, and particularly to so simplify and reduce the weight of such parts that they will affect the balance and function of the wheel in a minimum degree, and so that they will not be easily deranged incident to shocks and movements of the wheel. A further important object is to evolve means for performing the several functions required, and particularly in means to show specifically in pounds per square inch the air pressure in each tire of a vehicle.

It is a further object to combine a novel alarm signal which will insure that a motor driver will have faulty conditions brought to attention with great certainty.

A further important object is to present a system which may include a dash unit having simple indicators of the conditions in the several respective tires, and which will require a minimum of space and may be light, inexpensive, and adapted to operate with great certainty, so that the motor operator will have before him at all times a full showing of conditions in each of the tires.

Additional objects, advantages and features of invention reside in the construction, arrangement and combination of parts, involved in the embodiment of the invention, as will appear from the following description and accompanying drawings, wherein Figure 1 is a diagrammatic view of the system.

Figure 2 is a view of the dial panel.

Figure 3 is a front view of the dash unit for a four-wheel car with the dial plate removed.

Figure 4 is an enlarged rear elevation of one of the tire units.

Figure 5 is a vertical section thereof on the line 5—5 of Figure 4.

Figure 6 is a diagram of one of the indicator air pressure and alarm circuits.

Figure 7 is a longitudinal sectional view of the wheel commutator brush mounting.

Figure 8:
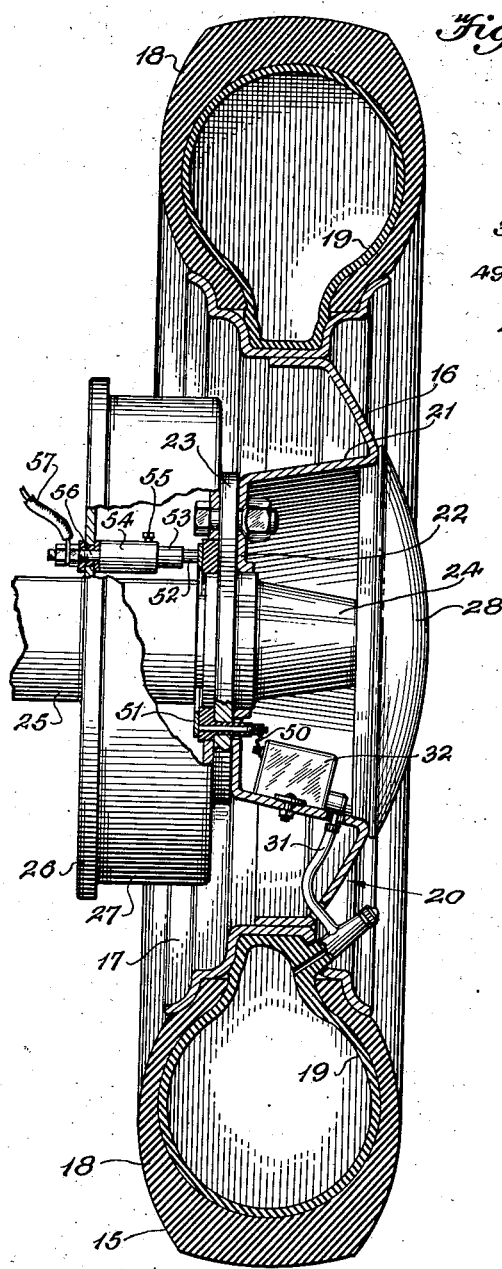
Figure 8 is a vertical section of a wheel in which my invention is incorporated.

There is illustrated a system which may include a motor vehicle or other vehicle having a multiplicity of pneumatic tires but in the specific instance provides for four tires 15 on the usual four wheels 16 of conventional manufacture. Each wheel includes a standard rim 17, in which there is fitted a familiar straight-side pneumatic tire shoe 18, within which an air retaining tube 19 of a usual construction is introduced. The wheel rim is carried on a pressed metal wheel body 20 the form of which may vary as required, and here includes an impressed central portion forming a frusto-conical wall 21 and inner mounting flange 22 adapted to be bolted at 22' to the usual hub flange 23, the hub body 24 of which may conform to approved construction familiar in the art.

The hub is mounted in a conventional way, the details of which are not shown, since they comprise no novel feature of this invention, and the mounting may include a usual axle housing 25, having the brake assembly plate 26, while on the hub flange there is mounted a standard form of brake drum 27 close to the plate 26.

The recessing of the body of the wheel forms a chamber within the wall 21, the inner side of which chamber is closed by the hub and the flange 22, while the outer side is closed by the usual removable cover or cap 28.

The tire air-retaining tube 19 is provided with a standard inflation nipple 29, and in this there is set a valve fitting 30, a lateral connection including a short hose 31, leading to a pressure-responsive dial operating device 32, mounted on the wall 22 within the wheel chamber. The valve fitting 29 may have in its outer part a standard form of air check valve, the details of which are not illustrated as they are familiar in the art. The connection 31 leads from the nipple 29 inwardly of the valve, so that air pressure within the tube is communicated at all times through the nipple and hose 31 to the pressure-responsive device 32. Other connections for the hose to the valve fitting may be provided as desired, or between the valve fitting and the pressure responsive device.

Figure 9:
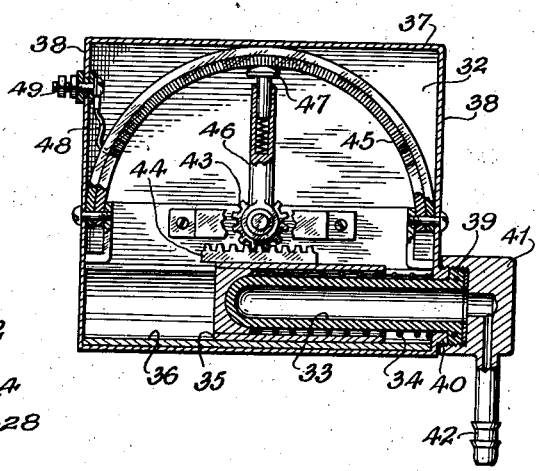
Figure 9 is a detail enlarged section longitudinally of the wheel-mounted pressure-responsive dial control device.
Figure 10:
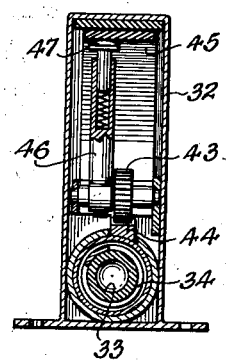
Figure 10 is a section at right angles to Figure 9.

The pressure-responsive device (see Figs. 8, 9, 10) consists of a bellows element longitudinally expansible in response to increase of fluid pressure therewithin and to contract when the pressure falls, and in the present instance is formally represented by a rubber sac 33 of substantially cylindrical form encircled by a close-fitting helical supporting spring 34, the outer end portion of which is fitted in a cylinder or sleeve 35 adapted to be moved longitudinally by expansion and contraction of the bellows and carried slidingly in a guide mounting 36, slotted longitudinally at the upper side. The cylinder is capped over the inner end of the bellows sac as shown. The guide mounting is fixed in a case 37 of simple rectangular form attached to the wall 22 of the wheel, and is set between opposite end walls 38, one of which is apertured to receive the open end of the sac 33 therethrough, the latter being formed with an enlargement or flange 39, and a collar 40 being formed on the case around the sac, externally threaded and receiving thereon a threaded cap 41 by which the flange 39 is compressed and an air-tight seal formed. The cap 41 has a lateral nipple 42 to which the hose 31 is connected detachably or otherwise, as may be required.

Over the guide 36 in the case 37, there is mounted revolubly a small pinion 43 for rotation on an axis transverse to the path of the sleeve 35, and the sleeve 35 has mounted thereon a rack 44 meshed with the pinion. Concentrically over the axis of the pinion 43 there is mounted a rheostat coil 45, the arcuate mounting piece of which is attached at its ends to the end walls of the case with suitable insulation. Incorporated integrally with the pinion 43 there is a brush arm 46 having a brush contact 47 thereon bearing on the inner side of the coil. As shown, a lead wire 48 is extended from the left end of the coil in Figure 9, to an insulated binding post 49 from which a connection 51 is made with an insulated commutator ring 50, on the outer side of the hub flange 23 within the brake drum 27. On the brake assembly plate there is mounted a spring-loaded brush 52 slidable longitudinally in a sleeve 53 which in turn is longitudinally adjustable in a socket 54 having a set screw 55 thereon impinging against the sleeve to hold the latter in adjusted positions. The socket 53 is formed with a stem 56 engaged through the plate 26 in a suitable insulating mounting, and an insulated wire 57 is extended therefrom to a respective dash unit indicator for the particular tire on the wheel described. The construction is similar in the other wheel units of the vehicle, and respective wires 57 are similarly led from each wheel unit indicators to be located at the dash or instrument panel customarily mounted before the vehicle operator or driver. The brush arm 46, pinion 43, rack sleeve 35 and its guide 36 as well as the case 37, being of metal and the latter being affixed to the wheel, the brush will serve as a ground from the coil 45 to the frame of the vehicle as ordinarily constructed, or other connection may be made from the brush arm 46 to one terminal of a battery 80 or other electrical source.

The case 37 is preferably in the form of an integral cap or cover stamping 58 forming the upper enclosing walls, and a bottom piece 58' to which the cover portion is welded to form a hermetic seal. Thus, in case of failure of the bellows device, the tire would not be deflated, and the vehicle could be operated until a proper repair or replacement of the instrument could be effected.

The dash installation includes individual indicator devices responsive to respective currents from the wires 57, and also a sounding alarm device responsive to any one of the indicators when a predetermined low pressure is reached, and will continue as long as the pressure is below such low point, which may be at a sufficiently high point to enable a continued moderately safe operation of the vehicle with such pressure in the tire or tires in which it exists, but calling attention to the urgent need for re-inflation, or repair. The dash installation may include a case 60 adapted to be mounted in an approved manner, and including four identical scaled dials 61, on a plate 62, as shown, the upper left one being for the left hand front tire, the upper right hand one being for the right hand front tire and the lower two being for the left and right rear tires, respectively. Each of the dial units being identical, only one will be described. It includes a pointer shaft 63, mounted suitably for free rotation on an axis normal to the plane of the dial, and having a pointer needle 64 mounted thereon in proper relation to the dial 61, this pointer being extended through the plate 62 and before the dial for ready observation. The shaft is provided intermediately of its length with an armature device 65, consisting of a multiplicity of radial magnetized arms 66—67, represented as having opposite polarity at opposite sides of the shaft. A permanent magnet 68 is mounted above the shaft at the left having pole pieces of opposite polarity extended into close relation to the armature, on such radii as to hold the pointer at a predetermined normal initial position, as shown in Figure 4 (this position, however, corresponds to a high air pressure). This magnet is also represented as having a winding 69, and in practice, has been wound with 800 turns of fine copper wire. Its core piece 70 may be of iron or steel, arranged radially with respect to the armature. Attached to its outer end there is an extended combined field piece and permanent magnet 71 which I have made of steel, extended inwardly beside the coil and beyond, and being turned inwardly at 72 toward the armature 65 on a radius of about 135 degrees, more or less, to the radius of the core 70. This extended end 72 is indicated conventionally as being the south pole of the magnet normally, and the opposed pole, formed by the inner end of the core 70 as being the north pole of this magnet normally. The winding is of such direction that the electrical magnetic field produced thereby is of the same polarity. This will serve to prevent complete reversal of the magnetic field of this magnet in the functioning of the adjacent electromagnet 74 to be described, and its field extension, as will subsequently appear.

The magnet 68 is mounted by non-magnetic bracket 73 on the case 60. An electro magnet 74 is mounted above the armature with its core piece 75 on a radius at an angle of approximately forty-five degrees to the radius of the core, and supported by a bracket 76 similar to the bracket 73, by which the first magnet was mounted. A field extension top bar 77 is affixed magnetically to the core 75, both of which may be of soft iron. The polarity of this magnet is the opposite of that of the first magnet, in relation to the armature 65, but will only affect the armature when electrically energized, or while a current is flowing in its windings 78. This winding I have heretofore made of 1,000 turns of fine copper wire. The two windings described are connected at 79' in series, the wire 57 leading to the outer end of the winding 78, and the outer end of the winding 69 being connected by wire 79 to one terminal of a battery 80 or other electrical source, the other terminal of which is grounded on the frame of the motor vehicle, completing the circuit to the case 37.

The field extension 77 of the electromagnet is projected into close relation to the upper end of the field piece 71, so that when the electromagnet is energized there will be a counter magnetic force tending to cause reversal or reduction in effective polarity in the field of this magnet, and particularly the pole 72.

On the shaft 63 there is mounted a brush contact arm 81, carrying the switch brush 82 at its outer end, and at a proper location for the function to be indicated, a contact sector 83 is mounted with which the brush 82 will engage as the shaft and arm 81 rotate counter clockwise from the high air pressure position as shown in Figure 4. The shaft 63 may be grounded at 84 to the frame 25, while from the contact sector 83 a circuit is completed through the wire 85' and the coil 85 of a buzzer formally represented at 86, and lead wire 87, to the battery 80.

The wire 85' may be continued past its connection with the coil 85, as a bus wire connecting to the sectors of all the units, whereby dangerous lowering of pressure in any tire will operate the buzzer and attract attention to the dial. The sector is located at such position that as the force of current increases with movement of the brush arm 46 and contact 47 from the far end of the coil 45 the magnets will operate on the armature to move it in a step-by-step rotation, and move the pointer 64 toward a low pressure position with respect to the dial 61, and the arm 81 will bring the contact brush 82 into engagement with the sector at the desired position, causing operation of the alarm which the buzzer constitutes.

In the operation of the invention, the parts being assembled as described, and assuming that all tires are properly inflated, the bellows devices will be projected to a maximum distance, and the contact 47 will be near the far end of the rheostat coil 45 from the lead-in connection with the commutator ring 51 of the wheel unit. The permanent magnet 68 will hold the armature at a position with the pointer 64 indicating the corresponding high pressure on the dial 61. The poles 70 and 72 being on radii of the armature less than 180 degrees apart opposite polarities of the armature will be on a diameter outward of this angle extending approximately vertical in Figure 4. The south pole of the magnet 74 will consequently be over the far portion of the south pole portion of the armature from the pole 70 of the magnet 68. As the current builds up in the magnet 74 the repulsion between the south pole of the latter magnet and the south pole portion of the armature will cause the latter to be moved to the left, rotating the armature counter-clockwise until the increased force of attaction or magnetic tension the south pole or lower end of the permanently magnetized element 71 and the north pole portion of the armature overcomes this tendency. Further build-up of current will produce further movement similarly, and the influence of the field extension 77 from the electromagnet 74 will add an increment of force that will reduce the efficiency of the poles pf the magnet 68, so that the north pole portion of the armature which was first at the lower side thereof, will come noticeably within the attractive influence of the pole 75 of the electromagnet. The result will be a progressive movement of the armature proportionate to the power of the current passed by the rheostat over an arc of 90 degrees, which includes the full length of the scale on the dial 61.

It should be understood that a comparatively small amount of electrical energy will be consumed by the device, owing to the use of small wire in the winding, as well as the effect of the resistance 45, and the current consumed in operation of the buzzer will be moderated in proportion to the resistance in the latter.

It will also be understood that the specific construction disclosed is purely exemplary and that various substitutions, and modifications of the construction and arrangements of parts in the system may be made without departing from the spirit of the invention except as limited by the following claims.

It will be appreciated that while the increase of the force of the magnet 68 will finally entirely overcome the residual magnetism of the permanent magnet, the effect of current passing through the winding 69 around its core 70 will preserve a field, which will prevent any abrupt movement of the armature. The windings may be varied relatively to attain the desired effects, as discretion may indicate.

I claim:

1. An indicator device consisting of a magnetic rotor having parts of opposite magnetic polarity on diametrically opposite sides, a pair of magnets having rectilinear cores mounted in operative relation to the rotor on radii at an angle less than 90 degrees, the outer end of the core of one having a field piece connected thereto extended into operative polar relation to the rotor on a radius at an angle of more than ninety degrees to the radius of the inner end of the same core, and the outer end of the core of the second magnet having a field piece extended into close operative relation to the outer end of the first named core, a pointer carried by the rotor, a dial scale in operative relation to the pointer, and an electrical winding on at least the core of said second magnet.

2. The structure of claim 1 in which the first named field piece extension is a permanent magnet, and the said second magnet is an electro magnet.

3. The structure of claim 1 in which the first named field piece extension is a permanent magnet, and coil windings on both magnets whereby both may become electro magnets, the winding of the said second magnet having more turns than the winding of the first magnet.

LAURANCE SCHULTZ.